(12) United States Patent
Thibault et al.

(10) Patent No.: US 8,688,341 B2
(45) Date of Patent: Apr. 1, 2014

(54) METHOD FOR MANAGING A BRAKING SYSTEM FOR AN AIRCRAFT FITTED WITH ELECTROMECHANICAL BRAKES

(75) Inventors: Julien Thibault, Gif sur Yvette (FR); Emmanuel Colin, Paris (FR); Stephane Mudry, Issy les Moulineaux (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 0 days.

(21) Appl. No.: 13/583,814

(22) PCT Filed: Mar. 11, 2011

(86) PCT No.: PCT/EP2011/001217
§ 371 (c)(1),
(2), (4) Date: Sep. 10, 2012

(87) PCT Pub. No.: WO2011/110363
PCT Pub. Date: Sep. 15, 2011

(65) Prior Publication Data
US 2013/0006447 A1    Jan. 3, 2013

(30) Foreign Application Priority Data
Mar. 12, 2010    (FR) ...................................... 10 51798

(51) Int. Cl.
*G06G 7/00*    (2006.01)
(52) U.S. Cl.
USPC .................................... 701/70; 701/3; 701/48
(58) Field of Classification Search
USPC .......................................... 701/3, 48, 70, 71
See application file for complete search history.

(56) References Cited

U.S. PATENT DOCUMENTS

| | | | |
|---|---|---|---|
| 6,744,162 B2 * | 6/2004 | Pierre et al. | 310/77 |
| 8,112,213 B2 * | 2/2012 | Cahill et al. | 701/70 |
| 8,374,764 B2 * | 2/2013 | Colin et al. | 701/70 |
| 2001/0045771 A1 | 11/2001 | Corio et al. | |
| 2005/0012385 A1 | 1/2005 | Sibre | |
| 2006/0152073 A1 | 7/2006 | Sibre | |
| 2006/0152080 A1 | 7/2006 | Chico et al. | |
| 2008/0030069 A1 * | 2/2008 | Griffith et al. | 303/20 |
| 2008/0284358 A1 * | 11/2008 | Ralea | 318/14 |
| 2010/0280725 A1 * | 11/2010 | Cahill | 701/70 |
| 2010/0332095 A1 * | 12/2010 | Colin et al. | 701/70 |
| 2011/0040466 A1 * | 2/2011 | Hill et al. | 701/74 |
| 2011/0079471 A1 * | 4/2011 | Colin et al. | 188/106 P |

FOREIGN PATENT DOCUMENTS

| | | |
|---|---|---|
| EP | 1 498 332 A1 | 1/2005 |
| EP | 1 679 242 A1 | 7/2006 |
| EP | 1 681 220 A1 | 7/2006 |

\* cited by examiner

*Primary Examiner* — Russell Frejd
(74) *Attorney, Agent, or Firm* — Sughrue Mion, PLLC

(57) ABSTRACT

A braking system for an aircraft with electric brakes comprising plural electromechanical actuators (2). The system comprises a braking control unit (20) delivering a normal braking setpoint (21) for one or more controllers (10) of the actuators, and selection logic (15) for causing the braking system to operate in a plurality of modes. The system includes: a normal braking mode where the control unit generates a normal braking setpoint (21) for the controller(s); an ultimate braking mode, having priority over the normal braking mode, being responsive to a parking control member, and controlling actuators to respond to the actuation of the parking control member; and a parking braking mode, applied in response to the parking control member and only if the aircraft is stationary, in which the actuators are controlled to apply a force in response to the parking control member being actuated and are then blocked in position.

3 Claims, 3 Drawing Sheets

METHOD FOR MANAGING A BRAKING SYSTEM FOR AN AIRCRAFT FITTED WITH ELECTROMECHANICAL BRAKES

CROSS REFERENCE TO RELATED APPLICATIONS

This application is a National Stage of International Application No. PCT/EP2011/001217 filed Mar. 11, 2011, claiming priority based on French Patent Application No. 10 51798, filed Mar. 12, 2010, the contents of all of which are incorporated herein by reference in their entirety.

The invention relates to a method of managing a braking system for an aircraft having electromechanical brakes.

TECHNOLOGICAL BACKGROUND OF THE INVENTION

Aircraft braking systems are generally designed to operate in several modes:
- a normal mode during which a braking control unit generates a braking setpoint for power delivery members (pressure servo-valve for hydraulic braking, a controller for electromechanical braking) that deliver a determined amount of power to the braking actuators;
- an alternative mode in which the primary power circuit has failed, and power is taken from a second power circuit;
- an emergency mode in which the braking control unit has failed, with the braking order then being transmitted directly from the pedals to the power distribution members, and thus without any anti-skid protection; in general, the power available at the brakes is deliberately limited in order to prevent the wheels from locking; and
- finally, in the last resort, an ultimate braking mode that consists in using parking braking for slowing down the aircraft.

It should be recalled that in hydraulically braked aircraft, parking braking consists in putting the cavities of the brakes into communication with an accumulator, with the pressure in that accumulator sufficing to deliver enough parking braking force to prevent the aircraft from moving. Parking braking (and thus ultimate braking) has priority over the other modes of braking, and in practice this priority is implemented very simply by means of a shuttle valve arranged upstream from the brakes to put them into communication either with the outlet from the parking accumulator, or with the outlet from the pressure servo-valve controlled by the braking control unit. In order to be certain that priority is complied with, the pressure in the parking accumulator is generally high, such that it forces the shuttle valve to switch, even if the pressure servo-valve attempts to impose its own pressure. It should be observed that upstream from the shuttle valve, the two control systems (using the braking control unit or the parking selector) are completely separate, in order to ensure the greatest possible segregation.

In aircraft having electric brakes, the situation is not that simple. Parking braking is obtained by causing the electromechanical braking actuators to apply a force, and then by causing the actuators to be blocked in position.

As with hydraulic braking systems, it is tempting to use parking braking as means for ultimate braking enabling the aircraft to be slowed down when all other braking means have become unavailable. Nevertheless, if for any reason the event that has lead to parking braking being used as ultimate braking should disappear (e.g. successfully rebooting the braking control unit so that it becomes operational once more), the blocking of the actuators can be problematic. For segregation reasons, the blocking logic is generally not controlled by the braking control unit, so the braking control unit has no way of unblocking the actuators. If the pilot does not remember to move the parking selector in order to cancel the parking order, then the actuators remain blocked.

OBJECT OF THE INVENTION

An object of the invention is to take maximum advantage of the new possibilities made available by electrical technology in order to provide an ultimate braking mode that does not present the above-mentioned risks.

BRIEF DESCRIPTION OF THE INVENTION

In order to achieve this object, the invention provides a braking system for an aircraft with electric brakes comprising a certain number of electromechanical actuators, the systems comprising a braking control unit delivering a normal braking setpoint for one or more controllers of the actuators, and selection means for causing the braking system to operate in a plurality of modes, including:
- a normal braking mode during which the braking control unit generates a normal braking setpoint for the controller(s);
- an ultimate braking mode, having priority over the normal braking mode, that is applied in response to actuation of a parking control member, and in which the actuators are controlled to apply a force in response to the actuation of the parking control member, but in which they are not blocked in position; and
- a parking braking mode, applied in response to actuation of a parking control member and only if the aircraft is stationary, in which the actuators are controlled to apply a force in response to the parking control member being actuated and are then blocked in position.

Thus, prior to causing the actuators to be blocked, it is verified whether the aircraft is still moving on the ground or is stationary. If the aircraft is still moving, then it must be understood that the pilot is seeking to use parking braking as ultimate braking for the purpose of slowing down the aircraft. The actuators are therefore not blocked, thus possibly allowing the braking control unit to take back control, even while the parking control member is actuated. It is only when the aircraft is stationary that it is possible to block the actuators, in order to provide genuine parking braking.

In a particular embodiment, the parking control member that is used is a member of the lever type having a stroke that makes it possible to vary the amount of ultimate braking between zero and a maximum ultimate braking force, which force is applied only when the lever reaches or exceeds a critical stroke.

Thus, not only is unwanted blocking of the actuators avoided, but a new ultimate braking mode is provided in which the pilot can vary the strength of braking. It should be observed that in the hydraulic ultimate mode, the imposed pressure is the pressure from the accumulator, so there is no way of varying the strength of braking.

BRIEF DESCRIPTION OF THE DRAWINGS

The invention can be better understood in the light of the following description of particular implementations of the method of the invention, given with reference to the figures of the accompanying drawings, in which.

DETAILED DESCRIPTION OF THE INVENTION

Figure 1:
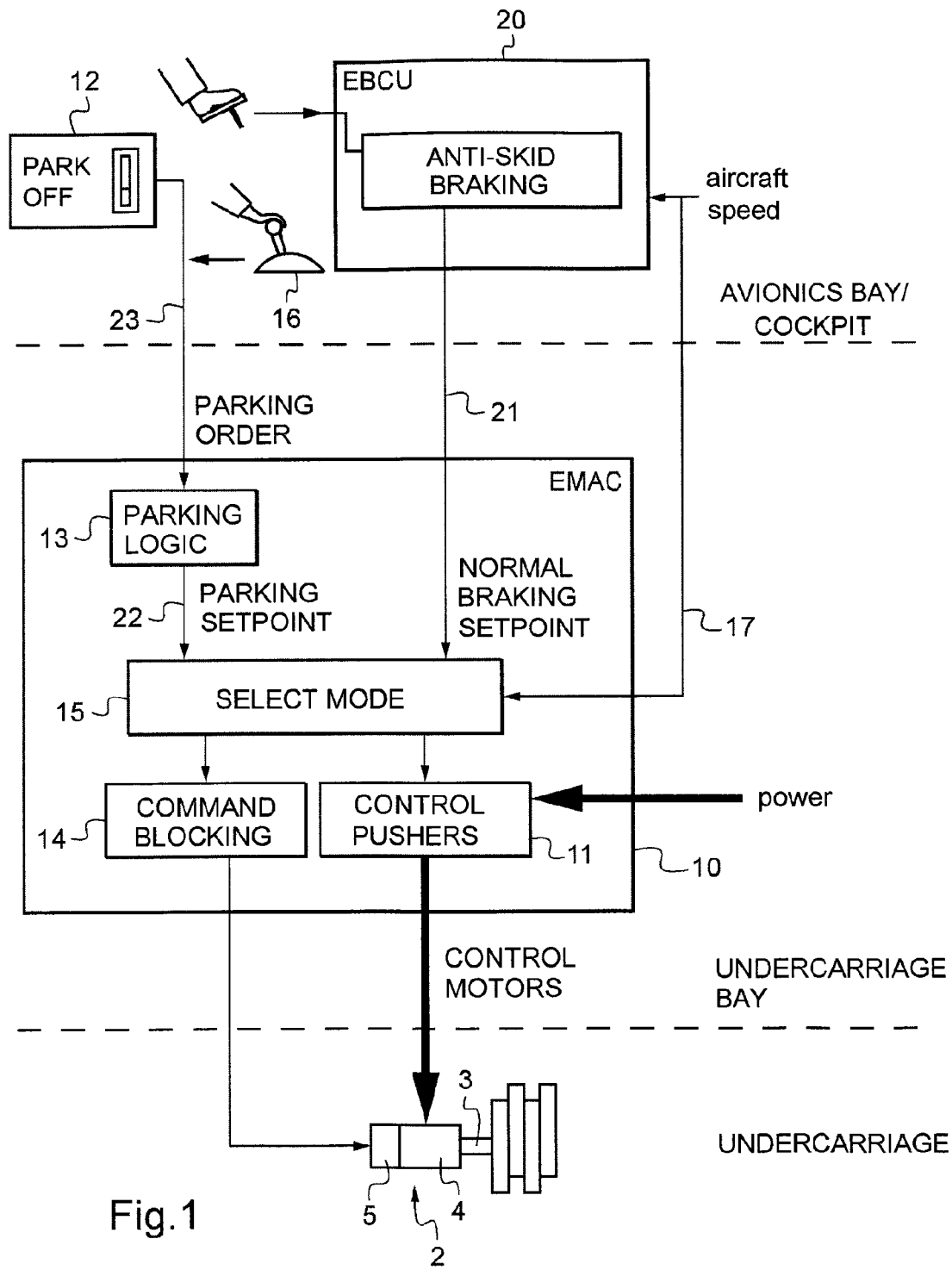
FIG. 1 is a diagrammatic view of a braking system architecture for an aircraft in a first implementation of the method of the invention.

With reference to FIG. 1, the architecture seeks to control electromechanical brakes, each comprising a certain number of electromechanical actuators 2 adapted to press selectively on a facing stack of disks. Each actuator 2 includes a pusher 3 driven by an electric motor 4 and is fitted with a parking-blocking member 5 that enables the pusher 3 to be blocked in position when the actuator has been caused to exert a parking brake force on the disks.

Each actuator 2 is connected to an electromechanical actuator controller (EMAC) 10 that serves to deliver electrical power to the motor 4 of the actuator in response to a braking setpoint 21 generated by an electronic braking control unit (EBCU). For this purpose, the controller 10 includes a control module 11 essentially comprising an inverter receiving power from at least one power supply bus of the airplane and delivering power therefrom as a function of the braking setpoint 21 in order to enable the motor or actuators connected to the controller to deliver sufficient power for the actuator to apply the desired force.

The braking setpoint 21 is generated either by actuating brake pedals, or by actuating an auto-brake lever, for controlling deceleration.

In practice, the braking control unit 20 is located in the avionics hold of the aircraft, while the EMAC 10 is preferably located as close as possible to the brake in order to minimize the length (and thus the weight) of the power supply cables. Each of the EMACs 10 is preferably located in one of the main undercarriage bays.

The pilot can control parking braking by generating a parking brake order by operating a parking brake selector 12 that sends an order directly to the EMACs 10 without passing via the braking control unit 20. Each EMAC 10 includes parking logic 13 that, in response to the parking order 23, consists in:
  delivering a parking setpoint 22 so that the pusher control module 11 powers the motors of the actuators to cause them to apply a determined parking braking force;
  on each actuator, operating a module 14 for controlling a member for blocking the pushers so as to block the pusher in position after it has applied the parking braking force; and
  regularly repeating the above two steps in order to adjust the parking force, since it might diminish, in particular as a result of expansion or contraction to which the brake is subjected.

The EMAC is configured to give priority to the parking braking order coming from the parking braking selector 12 over the braking setpoint 21 coming from the braking control unit 20. For this purpose, the EMAC includes selection logic 15 for selecting braking modes.

In the invention, the selection logic 15 receives as input a speed signal 17 indicative of movement of the aircraft. If the speed of the aircraft is below a given threshold, which in practice is small, the speed is preferably considered as being zero and the speed signal preferably changes state. The speed signal may represent the actual speed of the aircraft, it may be a signal representative of rotation of the wheels, or it may be any combination of those two signals.

By means of this speed signal 17, the selection logic 15 is capable of distinguishing between a parking mode, characterized by the parking brake selector being operated and speed being zero, an ultimate braking mode characterized by the parking brake selector being operated and by speed that is not zero, and naturally a normal braking mode in which the parking brake is not actuated while the braking control unit is delivering a braking setpoint, in compliance with the following table:

|  | Normal braking setpoint | Parking order | Speed signal |
| --- | --- | --- | --- |
| Normal mode | yes | no | — |
| Parking mode | — | yes | no |
| Ultimate mode | — | yes | yes |

Thus, the selection module 15 gives priority to parking mode and to ultimate braking mode over normal braking mode under the control of the braking control unit 20 once a parking order has been issued.

In normal braking mode, the selection module 15 deactivates the blocking member control module 14 and activates the pusher control module 11 so that the controlled actuator(s) apply(ies) a braking force representative of the braking setpoint generated by the braking control unit 20.

In ultimate braking mode, the selection module 15 deactivates the blocking member control module 14 and activates the pusher control module 11 so that the controlled actuator(s) apply(ies) an ultimate braking force.

In parking mode, the selection module 15 activates the pusher control module 11 so that the controlled actuator(s) apply(ies) a parking force and activates the blocking member control module 14 so as to enable the pushers of the actuators to be blocked.

For clarity in describing the invention, other braking modes are not shown herein, in particular an emergency braking mode in which the orders from the pedals are applied directly to the control unit 10.

The ultimate braking mode is very similar to the ultimate braking mode in hydraulic braking systems, except that it is possible in the ultimate braking mode to avoid applying the same braking force as in parking mode. It is advantageous to ensure that the braking force $F_{ult}$ in ultimate braking mode is less than the parking braking force $F_{park}$ in order to prevent the wheels from locking.

In a variant, and in a particularly advantageous implementation of the invention, instead of using the parking brake selector 12, it is possible to use a lever 16 that is also shown in FIG. 1 (it should naturally be understood that it replaces the parking brake selector 12) that has a stroke enabling the pilot to vary the braking force in ultimate braking mode, with the parking order being given by the pilot only when the lever is moved beyond a given stroke. For this purpose, the lever 16 is fitted with a sensor for delivering its position (expressed herein as a percentage of maximum stroke), and also an end-of-stroke contactor serving to detect that the lever has been taken to the end of its stroke.

Preferably, as and shown in FIG. 2, the control unit 10 interprets the signal coming from the lever 16 as follows. So long as the stroke of the lever is less than a critical stroke $S_{crit}$ (e.g. 80%), the applied force is a given proportion of a maximum ultimate braking force $F_{ult}$, which proportion corresponds to the percentage of the maximum stroke. If the stroke of the lever is equal to the critical stroke $S_{crit}$, the applied force is then equal either to the force $F_{ult}$, if the speed is non-zero, or else to the force $F_{park}$ if the speed is zero.

Thus, not only is an ultimate braking mode created (lever at the end of its stroke, aircraft speed non-zero), but in addition a second emergency braking mode is created that is not differential but that is proportional, in which mode the pilot can determine braking force by using the lever 16.

The architecture shown in FIG. 1 thus seeks to satisfy the constraint for complete segregation between parking control and normal braking. This segregation makes it possible to ensure that in the event of the braking control unit malfunctioning, it is still possible to implement parking mode and ultimate braking mode.

Nevertheless, such segregation makes it necessary to have the parking logic 13 in the EMAC 10. However, it may be advantageous to simplify the EMAC 10 as much as possible, in order to enable it to be located as close as possible to the brakes, i.e. directly on the undercarriage or even on the brake itself.

Figure 3:
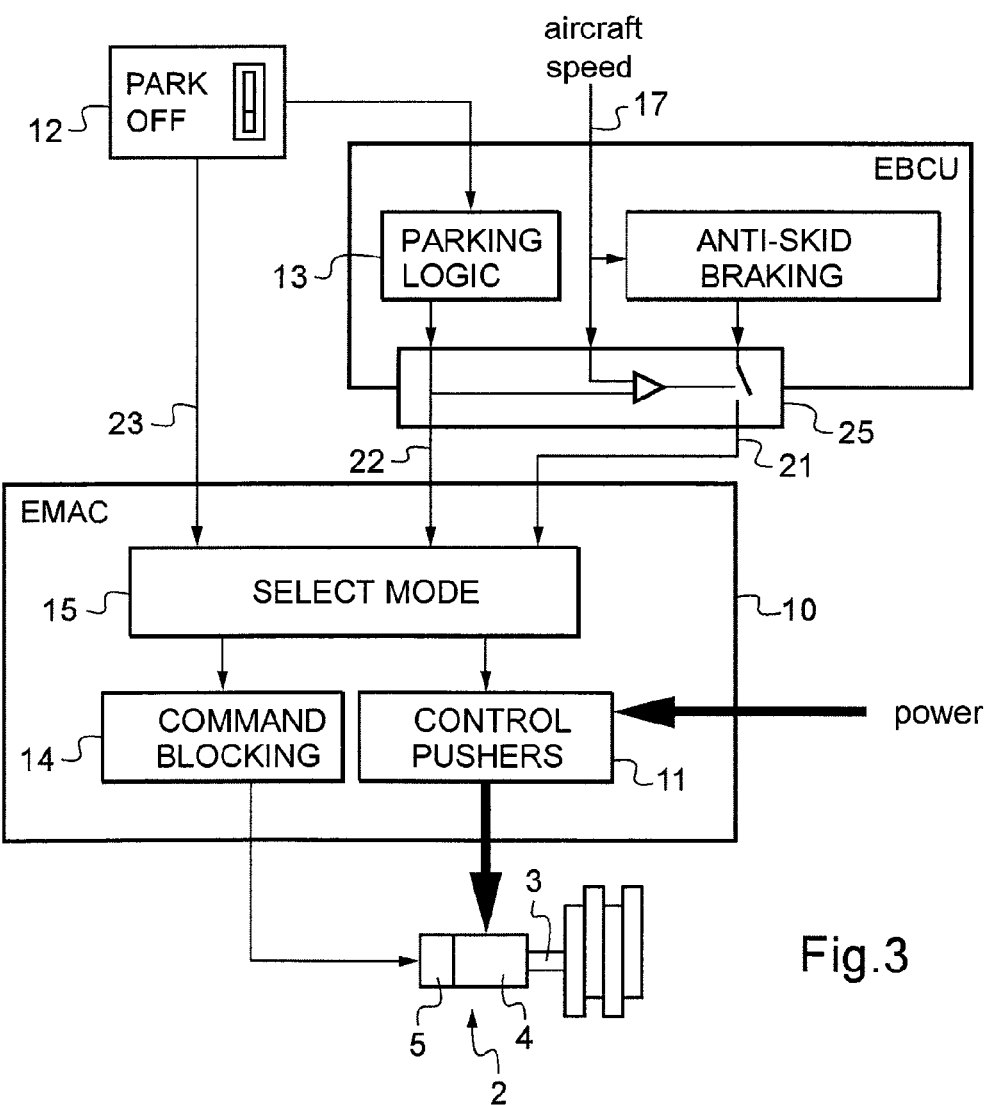
FIG. 3 is a diagrammatic view of a braking system architecture for an aircraft in a second implementation of the method of the invention.

FIG. 3 shows a braking system architecture including a simplified EMAC. In this figure, there can be seen the braking control unit 20, the EMAC 10 with its selection module 15, its control module for controlling the pushers 11, and its blocking member control module 14. However, the parking logic 13 in this embodiment has been moved to be located in the braking control unit.

Thus, the parking order coming from the parking selector 12 is now delivered not only to the EMAC 10, but also the braking control unit 20.

In the braking control unit, it is naturally appropriate to separate as much as possible the means for generating the normal braking setpoint 21 and the means for generating the parking setpoint. In practice, it is possible to use two independent software channels, each implemented by a distinct processor.

The operation of this architecture is as follows: in normal braking mode, the braking control unit 20 delivers a braking setpoint 21 to the EMAC 10. The selection module 15 deactivates the blocking member control module 14 and activates the module 11 for controlling the pushers so that it controls the actuators in order to exert a braking force representative of the braking setpoint.

If the pilot moves the parking selector 12 (or the parking lever 16), then the braking control unit acts via the parking logic 13 to generate a parking setpoint 22.

This is sent to the selection module 15 that also receives the signal directly from the parking selector 12.

In the ultimate braking mode, the selection module 15 deactivates the blocking member control module 14 and activates the pusher control module 11 so that the controlled actuator(s) apply(ies) an ultimate braking force.

Finally, in the parking mode, selection module 15 activates the pusher control module 11 so that the controlled actuator(s) apply(ies) a parking force and it activates the blocking member control module 14 to enable the pushers of the actuators to be blocked.

In this example, and in a particular aspect of the invention, the selection module recognizes the operating modes without having recourse to the speed signal 17.

In a first manner of selecting these modes, the braking control unit 20 is fitted with a controlled switch 25 that inhibits the normal braking setpoint 21 if a braking setpoint 22 is generated and if the speed signal 17 is not zero.

Thus, in normal operation, i.e. so long as the pilot has not operated the parking selector 12, the normal braking setpoint 21 is normally delivered and reaches the selection module 15, which understands that the braking system is in normal operation mode.

If the pilot actuates the parking selector 12 while the aircraft is moving, the controlled switch 25 inhibits the braking setpoint 21 which no longer reaches the selection module, whereas the parking setpoint 22 generated by the parking logic 13 does reach the selection module 15. This module then understands that the braking system is in ultimate braking mode.

Finally, if the pilot actuates the parking selector 12 while the aircraft is stationary, the controlled switch 25 does not inhibit the braking setpoint 21, which reaches the selection module 15 in parallel with the parking setpoint 22. The selection module thus understands that the braking system is in parking brake mode.

Under all circumstances, the parking order 23 from the parking selector 12 is applied directly to the selection module 15.

Thus, the operating modes are selected using the following criteria:

|  | Normal braking setpoint | Parking setpoint | Parking order |
| --- | --- | --- | --- |
| Normal mode | yes | no | no |
| Parking mode | no | yes | yes |
| Ultimate mode | yes | yes | yes |

The controlled switch 25 is preferably a hardware switch so as to be certain of operating regardless of the orders delivered in software manner by the braking control unit. The hardware/software distinction serves to provide segregation that could otherwise no longer be provided because the parking logic is incorporated in the braking control unit. In particular, it should be observed that by having the hardware switch 25, the ultimate braking mode takes priority so long as the aircraft is running on the ground.

In a variant, instead of a switch cutting off the power supply to the braking control unit, it is possible to use other means for preventing the braking control unit from transmitting an order to the EMAC 10 if ultimate braking mode is required. For example, it would be possible to use fuse means that permanently cut off the power supply to the braking control unit (until action is taken to reconnect the power supply to the braking control unit), so as to ensure that once the aircraft has stopped, the braking control unit is not switched back on and cannot give undesirable orders, e.g. relaxing the braking force. It is also possible to use means that interrupt the transmission of orders from the braking control unit to the EMAC in response to detecting the signal representative of a non-zero speed.

Figure 4:
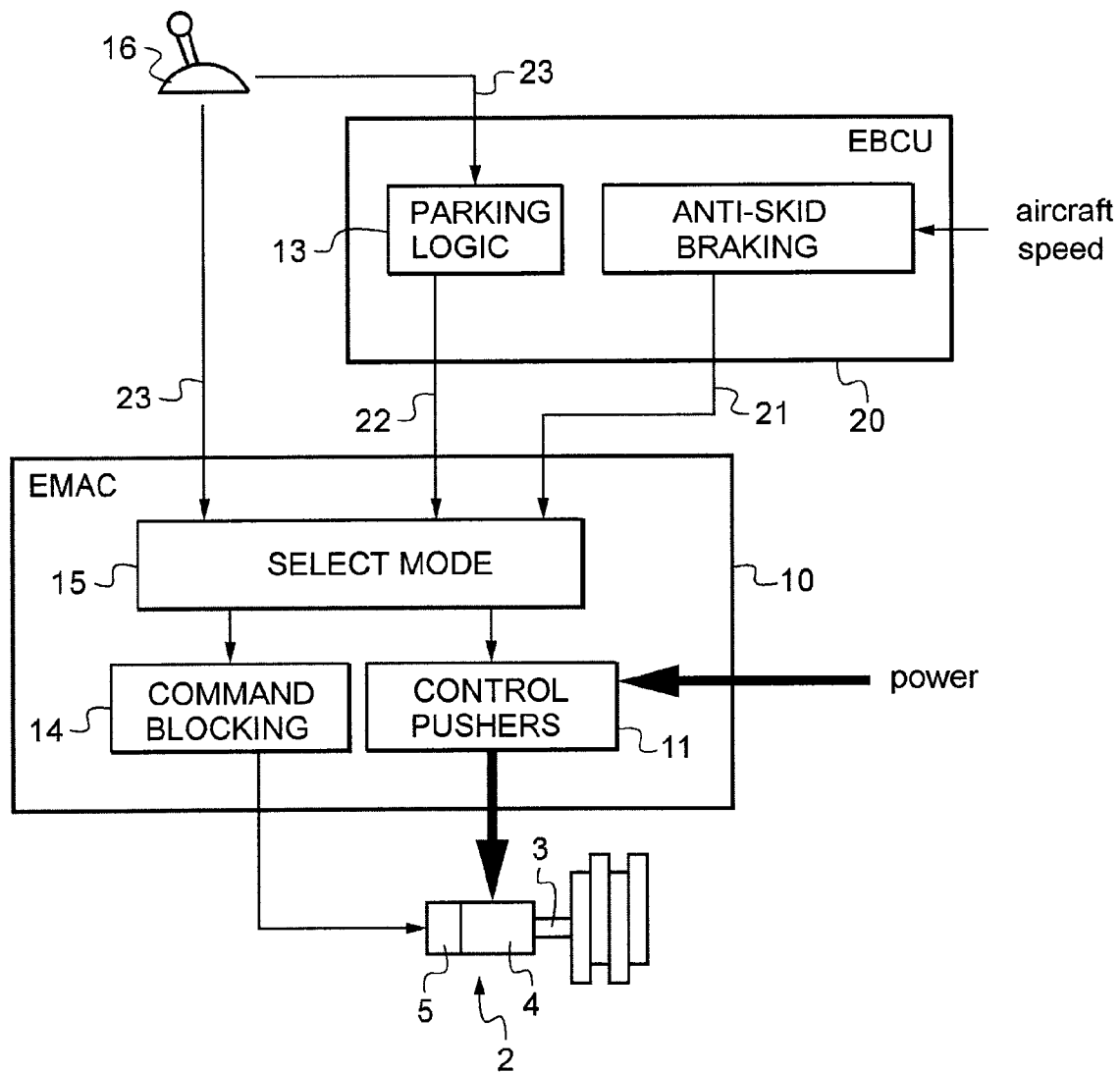
FIG. 4 is a diagrammatic view of a braking system architecture for an aircraft in a third implementation of the method of the invention.

Naturally, as shown in FIG. 4, the parking selector 12 may be replaced by a lever 16 enabling the pilot in ultimate braking mode to vary the braking force.

In this respect, the signal from the lever may be used to select between braking modes, thus avoiding having recourse to a controlled switch that inhibits the normal braking setpoint in order to indicate ultimate braking mode.

Figure 2:
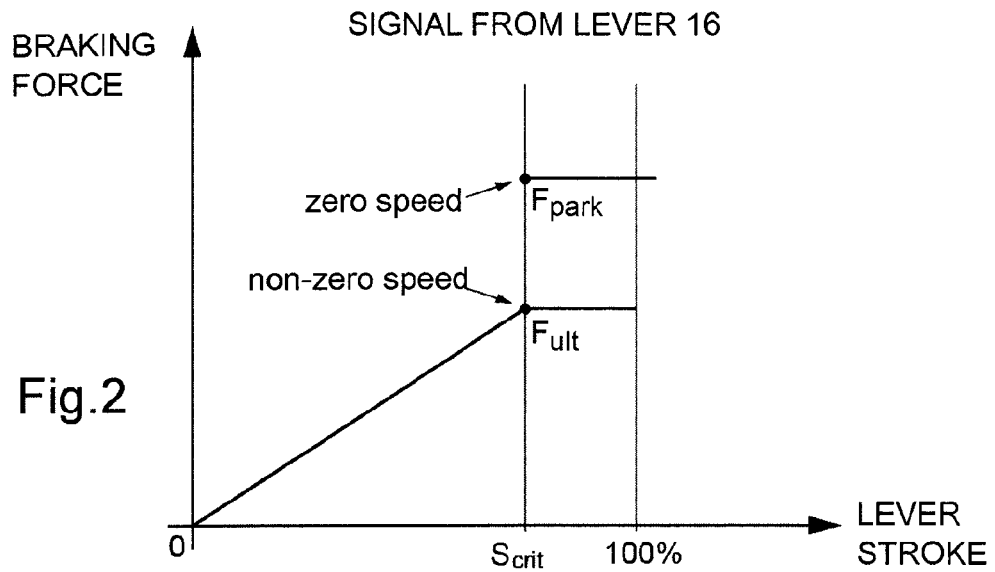
FIG. 2 is a graph of parking lever force that can be used with the architecture of FIG. 1.

Assuming that the signal from the lever is used in compliance with the scheme of FIG. 2, the use of a lever makes it possible in reliable manner to determine which braking mode to apply, using the following arrangements:

|  | Stroke of lever | Normal braking setpoint | Parking setpoint |
| --- | --- | --- | --- |
| Normal mode | C = 0 | yes | no |
| Ultimate mode | $0 < C < S_{crit}$ | no | yes |
| Parking mode | $C < S_{crit}$ | no | yes |

Thus, the selection module 15 is capable of discriminating between the operating modes by means of the signal coming from the lever 16.

The invention is not limited to the above description, but on the contrary covers any variant coming within the ambit defined by the claims.

What is claimed is:

1. A braking system for an aircraft with electric brakes comprising:
    at least one electromechanical actuator (2),
    at least one controller (10) for said at least one electromechanical actuator,
    a braking control unit (20) delivering a normal braking setpoint (21) for one or more of said at least one controller (10) of the at least one actuator, and
    selection means (15) for causing the braking system to operate in a plurality of modes, including:
    a normal braking mode during which the braking control unit generates a normal braking setpoint (21) for the at least one controller;
    an ultimate braking mode, having priority over the normal braking mode, that is applied in response to actuation of a parking control member, and in which the at least one actuator is controlled to apply a force in response to the actuation of the parking control member, but in which they are not blocked in position; and
    a parking braking mode, applied in response to actuation of a parking control member and only if the aircraft is stationary, in which the at least one actuator is controlled to apply a force in response to the parking control member being actuated and is then blocked in position.

2. A braking system according to claim 1, wherein the parking control member is a parking selector (12), and wherein the selection means (15) select the operating mode to apply as a function of various signals including: the normal braking setpoint (21); a parking setpoint (22) delivered by parking logic (13) for which a parking order (23) is transmitted on actuation of the parking selector; and a signal (17) representative of the speed of the aircraft.

3. A braking system according to claim 1, wherein the parking control member is a parking lever (12) delivering a parking order proportional to a stroke of the lever, and wherein the selection means (15) select the operating mode to be applied as a function of various signals, including: the normal braking setpoint (21); a parking setpoint (22) delivered by a parking logic (13) to which a parking order (23) is transmitted on actuation of the parking control member; and the parking order.

* * * * *